(12) United States Patent
Liang

(10) Patent No.: US 11,851,580 B2
(45) Date of Patent: Dec. 26, 2023

(54) STRETCHABLE CONDUCTIVE FLUOROELASTOMER PASTE COMPOSITION

(71) Applicant: DUPONT ELECTRONICS, INC., Wilmington, DE (US)

(72) Inventor: Yu Teng Liang, Wilmington, DE (US)

(73) Assignee: Du Pont China Limited, Wilmington, DE (US)

(*) Notice: Subject to any disclaimer, the term of this patent is extended or adjusted under 35 U.S.C. 154(b) by 54 days.

(21) Appl. No.: 17/519,339

(22) Filed: Nov. 4, 2021

(65) Prior Publication Data

US 2022/0056283 A1 Feb. 24, 2022

Related U.S. Application Data

(62) Division of application No. 16/576,187, filed on Sep. 19, 2019, now abandoned.

(60) Provisional application No. 62/746,269, filed on Oct. 16, 2018.

(51) Int. Cl.

| | |
|---|---|
| *C09D 5/24* | (2006.01) |
| *C09D 7/40* | (2018.01) |
| *C09D 7/61* | (2018.01) |
| *C09D 127/16* | (2006.01) |
| *C09D 11/52* | (2014.01) |
| *C09D 11/106* | (2014.01) |
| *C09J 9/02* | (2006.01) |
| *C09J 11/04* | (2006.01) |
| *C09J 127/16* | (2006.01) |
| *C09D 11/03* | (2014.01) |
| *C08K 3/08* | (2006.01) |
| *C08K 7/00* | (2006.01) |

(52) U.S. Cl.
CPC ............... *C09D 5/24* (2013.01); *C09D 7/61* (2018.01); *C09D 7/70* (2018.01); *C09D 11/03* (2013.01); *C09D 11/106* (2013.01); *C09D 11/52* (2013.01); *C09D 127/16* (2013.01); *C09J 9/02* (2013.01); *C09J 11/04* (2013.01); *C09J 127/16* (2013.01); *C08K 7/00* (2013.01); *C08K 2003/0806* (2013.01); *C08K 2201/001* (2013.01)

(58) Field of Classification Search
CPC ........ C09D 5/24; C09D 11/52; C09D 127/16; C09D 127/20; C09D 7/61; C09D 7/70; H01B 1/22; H05K 1/095; C09J 127/16; C08K 3/08; C08K 5/5435; C08K 13/02; C08K 7/00; C08K 2003/0806; C08K 2003/812; C08K 2003/0831; C08K 2003/085; C08K 2003/0862; C08K 2202/001; C08K 3/04
USPC ...... 252/500, 510, 511, 514, 518.1; 428/206
See application file for complete search history.

(56) References Cited

U.S. PATENT DOCUMENTS

| | | | | |
|---|---|---|---|---|
| 4,482,476 A | * | 11/1984 | Yoshimura | C09D 5/24 252/502 |
| 10,176,903 B2 | | 1/2019 | Sekitani et al. | |
| 2002/0122922 A1 | * | 9/2002 | Yamada | B41M 7/0054 427/152 |
| 2013/0175485 A1 | | 7/2013 | Kanamaru et al. | |
| 2014/0305923 A1 | | 10/2014 | Dorfman et al. | |
| 2015/0353779 A1 | | 12/2015 | Mu et al. | |
| 2016/0035456 A1 | * | 2/2016 | Sauro | H01B 1/24 252/511 |
| 2019/0185662 A1 | * | 6/2019 | Zhou | B32B 15/08 |

FOREIGN PATENT DOCUMENTS

| | | | | | |
|---|---|---|---|---|---|
| CN | 107987675 A | * | 5/2018 | | B05D 7/16 |
| CN | 108976675 A | | 12/2018 | | |

* cited by examiner

*Primary Examiner* — Tri V Nguyen

(74) *Attorney, Agent, or Firm* — Dority & Manning, P.A.

(57) ABSTRACT

The invention relates to a polymer thick film (PTF) conductive paste composition comprising a conductive powder, a fluoroelastomer, a silane coupling agent, and one or solvents. The PTF conductive paste composition can be used to form a printed conductor and to form an electrically conductive adhesive on various articles. The PTF conductive paste composition is provides a stretchable electrical conductor for wearables.

15 Claims, No Drawings

STRETCHABLE CONDUCTIVE FLUOROELASTOMER PASTE COMPOSITION

CROSS-REFERENCE TO RELATED APPLICATION

This application claims benefit of U.S. Provisional Patent Application Ser. No. 62/746,269, filed Oct. 16, 2018, and entitled "Stretchable Conductive Fluoroelastomer Paste Composition," which application is incorporated herein in its entirety for all purposes by reference thereto.

FIELD OF THE INVENTION

This invention is directed to a stretchable polymer thick film conductive fluoroelastomer paste composition for wearables and in mold electronics.

BACKGROUND OF THE INVENTION

There is increasing interest in incorporating electrical circuits in wearable garments to monitor physiological aspects of the wearer. Examples of such measurements include heart rate, electrocardiography, temperature and bodily fluids. These circuits must be maintained as the garment or article is stretched and when exposed to multiple wash and dry cycles. Another use for electrical circuits in wearable garments is in heaters.

In addition, there is a need for electrically conductive adhesives that can tolerate the stretching and deformation that occurs during thermoforming and injection molding processes for In Mold Electronics (IME).

SUMMARY OF THE INVENTION

This invention relates to a stretchable polymer thick film conductive paste composition that may be used to form a printed conductor in a wearable garment, to form an electrically conductive adhesive for In Mold Electronics or to form a printed conductor for consumer electronics. It forms a stretchable conductive polymer thick film.

The invention provides a polymer thick film conductive paste composition comprising:
 a) 45-65 wt % conductive powder;
 b) 10-20 wt % fluoroelastomer;
 c) 0.1-3 wt % silane coupling agent;
 d) 0-35 wt % of one or more solvents selected from the group consisting of 2-(2-ethoxyethoxy)ethyl acetate, diethylene glycol monobutyl ether acetate, ethylene glycol diacetate, dibasic esters and C11 ketones; and
 e) 1-35 wt % of one or more solvents selected from the group consisting of triethyl phosphate, acetone, 4-methyl-2-pentanone, 2,6-dimethyl-4-heptanone and cyclohexane, wherein wt % are based on the total weight of the paste composition.

DETAILED DESCRIPTION OF THE INVENTION

The invention relates to a polymer thick film (PTF) conductive paste composition comprising a conductive powder, a fluoroelastomer, a silane coupling agent, and one or more solvents.

The PTF paste composition can be used to form printed conductors in various articles. The PTF paste composition can be used to form printed conductors that can be used in wearable garments. In one embodiment the conductor is printed directly on the garment fabric. In another embodiment the conductor is printed on a substrate which is then subsequently laminated to the garment. This stretchable printed conductor maintains its usefulness during the stretching and washing and drying that such a garment undergoes. The paste can be used to form conductors in other articles and for heaters in seats.

The PTF paste composition can also be used to form printed conductors and to form an electrically conductive adhesive (ECA) for other articles. These articles can be thermoformed and subsequently subjected to injection molding and the printed conductor or electrically conductive adhesive tolerates the stretching and deformation that occurs during these processes.

The paste composition is named a polymer thick film paste composition because the polymer remains as a component in the printed conductor. Describing the instant paste composition as "conductive" is done so meaning that the composition can be printed onto a substrate and dried to form an electrical conductor with electrical conductivity sufficient for conducting electrical current between devices and circuitry connected thereto or between components of a circuit. In many instances, a mechanical and electrical connection made with the present ECA can be an alternative to traditional soldering.

The various components of the PTF conductive paste composition are discussed in more detail below. Weight percent is written as wt %.
Conductive Powder The conductive powder is an electrically conductive powder of one or more of Ag, Cu, Au, Pd, Pt, Sn, Al, Ni, C, alloys thereof and mixtures thereof.

In an embodiment, the conductive powder is silver powder,
In another embodiment the silver powder is in the form of silver flakes.

The amount of conductive powder in the PTF paste composition is 40-65 wt %, wherein the wt % is based on the total weight of the polymer thick film paste composition.
Fluoroelastomer In one embodiment, the fluoroelastomer is a vinylidene fluoride-containing fluoroelestomer copolymer. The copolymer may be a terpolymer or a dipolymer.

In one such embodiment, the fluoroelastomer is a terpolymer of vinylidene fluoride, hexafluoropropylene and tetrafluoroethlyene. In another embodiment, the fluoroelastomer is a terpolymer of vinylidene fluoride, perfluoromethyl vinyl ether, and tetrafluoroethylene.

In another embodiment, the fluoroelastomer is a dipolymer of vinylidene fluoride and hexafluoropropylene.

In other embodiments, the fluoroelastomer does not contain vinylidene fluoride. One such fluoroelastomer is a terpolymer of ethylene, tetrafluoroethylene and perfluoromethyiethylvinylether.

The amount of fluoroelastomer is 10-20 wt %, wherein the wt % are based on the total weight of the polymer thick film paste composition.
Silane Coupling Agent Typical silane coupling agents are [3-(2,3-epoxypropoxy)propyl]trimethoxysilane (3-glycidyloxypropyltrimethoxysilane), (aminopropyl)trimethoxysilane, (methacryloxypropyl)trimethoxysilane, (vinyl)trimethoxysilane and (mercaptopropyl)trimethoxysilane.

In one embodiment the silane coupling agent is [3-(2,3-epoxypropoxy)propyl]trimethoxysilane (3-glycidyloxypropyltrimethoxysilane).

The amount of silane coupling agent is 0.1-3 wt %, wherein the wt % is based on the total weight of the polymer thick film paste composition.

Solvents

The solvents consist of 0-35 wt % of one or more solvents selected from the group consisting of 2-(2-ethoxyethoxy) ethyl acetate (diethylene glycol monoethyl ether acetate), diethylene glycol monobutyl ether acetate, ethylene glycol diacetate, dibasic esters and c11 and 1-35 wt % of one or more solvents selected from the group consisting of triethyl phosphate, acetone, 4-methyl-2-pentanone, 2,6-dimethyl-4-heptanone and cyclohexane.

In one embodiment, the solvents consist of 0-35 wt % 2-(2-ethoxyethoxy)ethyl acetate and 1-35 wt % triethyl phosphate, wherein the wt % are based on the total weight of the polymer thick film composition.

EXAMPLES AND COMPARATIVE EXPERIMENTS

Examples 1-4 and Comparative Experiments 1 and 2

The fluoroelastomer used in each of Examples E1-E3 and Comparative Experiments CE1-CE2 was a terpolymer of vinylidene fluoride, hexafluoropropylene and tetrafluoroethylene and each PTF paste composition was prepared as follows.

A sheet of vinylidene fluoride, hexafluoropropylene, and tetrafluoroethylene terpolymer (Viton®GBL200, Chemours Co., Wilmington, DE) was cut into small pieces and added to a solvent blend of 10 wt % triethyl phosphate and 90 wt % 2-(2-ethoxyethoxy)ethyl acetate. The amount of terpolymer was 40 wt % based on the total weight of the terpolymer and the solvent blend. The mixture was stirred at 60° C. for up to 18 hours until the fluoroelastomer was fully dissolved in the solvent, forming the terpolymer medium.

Silver flake (DuPont Co., Wilmington, DE) and silane coupling agent [3-(2,3-epoxypropoxy)propyl]trimethoxysilane (Dynasalyn® GLYMO, Evonik Corp. USA, Parsippany, NJ) were added to the terpolymer medium. Triethyl phosphate and 2-(2-ethoxyethoxy)ethyl acetate were also added to control the viscosity during mixing. This mixture was then 3-roll milled to fully disperse the components. Finally viscosity adjustment was performed using additional triethyl phosphate and 2-(2-ethoxyethoxy)ethyl acetate to a target viscosity between 30-90 Pa·S to produce the paste composition.

The amounts of components in weight percent used in Examples E1-E4 and Comparative Experiments CE1-CE2 are shown in Table I. The wt % are based on the total weight of the composition.

TABLE I

|  | CE1 | CE2 | E1 | E2 | E3 | E4 |
|---|---|---|---|---|---|---|
| Silver Flake | 55.5 | 55.0 | 54.8 | 54.7 | 51.8 | 56.4 |
| Terpolymer | 14.6 | 14.4 | 14.4 | 14.4 | 15.5 | 14.8 |
| Silane Coupling Agent | — | — | 0.5 | 0.5 | 0.5 | 0.5 |
| 2-(2-ethoxyethoxy)ethyl acetate | 26.9 | 29.1 | 27.3 | 28.9 | 29.0 | 0.0 |
| Triethyl phosphate | 3.0 | 1.5 | 3.0 | 1.5 | 3.2 | 28.4 |

The five pastes produced as described were each screen printed using a 200-325 mesh count screen onto a substrate of thermoplastic polyurethane film containing an adhesive layer. The substrates were either DuPont™ Intexar® TE-11C (DuPont Co., Wilmington, DE) or Bemis™ ST-604 (Bemis Associates Inc., Shirley, MA). Printed patterns were dried at between 100-130° C. for 10-20 minutes in a convection or belt furnace to form the printed conductors.

Printed pattern substrates were trimmed and laminated onto fabric using a hot press at 130° C. for 30 sec. Samples were loaded into launder-o-meter canisters and operated using the AATCC (American Association of Textile Chemists and Colorists) Test Method 61. At select cycles, samples were air dried at room temperature for 4 or more hours after which 4-point electrical resistance measurements were made on the printed conductors. The initial resistances and the resistances after the indicated number of cycles of each printed conductor are shown in Table II in ohms. The substrates that were applied to the fabric are indicated by either TE-11C or ST-604 as described above. The results show the improved wash durability of the conductors formed from the instant paste composition

TABLE II

AATCC Launder-O-Meter Electrical Resistances

| Paste | Substrate | Initial (Ω) | Cycle 1 (Ω) | Cycle 3 (Ω) | Cycle 5 (Ω) | Cycle 10 (Ω) |
|---|---|---|---|---|---|---|
| CE1 | ST-604 | 1.09 | 37.9 | >1000000 | — | — |
| CE1 | ST-604 | 1.47 | 10.3 | 35.2 | 71.8 | >1000000 |
| CE1 | TE-11C | 1.95 | 51.6 | >1000000 | — | — |
| CE1 | TE-11C | 1.95 | 34.6 | >1000000 | — | — |
| CE2 | ST-604 | 1.23 | 29.8 | >1000000 | — | — |
| CE2 | ST-604 | 1.22 | 7.25 | 30.5 | 49.8 | 858 |
| CE2 | TE-11C | 1.75 | 15.3 | 2500 | >1000000 | — |
| CE2 | TE-11C | 1.52 | 15.2 | 236 | 1018 | >1000000 |
| E1 | ST-604 | 2.05 | 5.66 | 8.76 | 10.8 | 13.1 |
| E1 | ST-604 | 1.66 | 4.61 | 7.03 | 8.18 | 10.7 |
| E1 | TE-11C | 1.71 | 9.14 | 25.1 | 49.3 | 98.9 |
| E1 | TE-11C | 1.59 | 9.05 | 29.9 | 33.2 | 71.4 |
| E2 | ST-604 | 1.30 | 4.03 | 6.01 | 8.63 | 15.6 |
| E2 | ST-604 | 1.40 | 3.54 | 7.71 | 11.8 | 19.9 |
| E2 | TE-11C | 1.76 | 7.73 | 23.9 | 45.4 | 71.4 |
| E2 | TE-11C | 1.75 | 11.7 | 45.0 | 49.7 | 88.7 |
| E3 | ST-604 | 2.10 | 6.45 | 9.51 | 11.9 | 11.0 |
| E3 | ST-604 | 2.28 | 11.0 | 26.9 | 28.1 | 13.5 |
| E3 | TE-11C | 2.23 | 8.53 | 20.5 | 26.9 | 21.6 |
| E3 | TE-11C | 2.51 | 10.6 | 37.0 | 63.2 | 49.2 |

Examples 5-6

The fluoroelastomer used in Example E5 was a terpolymer of vinylidene fluoride, hexafluoropropylene and tetrafluoroethylene. The fluoroelastomer used in Example E6 was a dipolymer of vinylidene fluoride and hexafluoropropylene. Each PTF paste composition was prepared essentially as described for Examples E1-E4 and Comparative Experiments CE1-CE2.

The amounts of components in weight percent used in Examples E5-E6 are shown in Table III. The wt % are based on the total weight of the composition.

TABLE III

|  | E5 | E6 |
|---|---|---|
| Silver Flake | 50.7 | 53.6 |
| Terpolymer | 14.9 | — |
| Dipolymer | — | 15.6 |
| Silane Coupling Agent | 0.5 | 0.5 |
| 2-(2-ethoxyethoxy)ethyl acetate | 30.5 | 27.3 |
| Triethyl Phosphate | 3.4 | 3.1 |

The two pastes produced as described were each screen printed using a 200-325 mesh count screen onto a substrate of thermoplastic polyurethane film containing an adhesive layer. The substrates were DuPont™ Intexar® TE-11C (DuPont Co., Wilmington, DE). Printed patterns were dried at between 100-130° C. for 10-20 minutes in a convection or belt furnace to form the printed conductors.

Printed pattern substrates were trimmed and 4-point electrical probes were attached to the printed conductors. Each sample was repeatedly stretched to and from 40% strain at a speed of 1 in/3 sec with a hold time of 2 sec after each cycle. Electrical resistances of the printed conductor were monitored and the maximum resistance in each cycle was recorded. The results are shown in Table IV

TABLE IV

| Paste | Initial (Ω) | Cycle 1 (Ω) | Cycle 5 (Ω) | Cycle 10 (Ω) | Cycle 15 (Ω) | Cycle 25 (Ω) |
|---|---|---|---|---|---|---|
| E5 | 2.93 | 56.93 | 150.59 | 254.28 | 398.71 | 929.02 |
| E6 | 3.81 | 54.56 | 155.18 | 296.61 | 521.51 | 1484.78 |

What is claimed is:

1. A wearable garment comprising a printed conductor formed from a polymer thick film conductive paste composition wherein the polymer thick film conductive paste composition comprises:
   a) 45-65 wt % conductive powder;
   b) 10-20 wt % fluoroelastomer;
   c) 0.1-3 wt % silane coupling agent;
   d) at least one solvent comprising:
   (i) 1-35 wt % of one or more solvents selected from the group consisting of 2-(2-ethoxyethoxy)ethyl acetate, diethylene glycol monobutyl ether acetate, ethylene glycol diacetate, and dibasic esters; and
   (ii) 1-35 wt % of one or more solvents selected from the group consisting of triethyl phosphate, acetone, 4-methyl-2-pentanone, 2,6-dimethyl-4-heptanone and cyclohexane, wherein the wt % are based on a total weight of the polymer thick film conductive paste composition.

2. The wearable garment of claim 1, wherein the fluoroelastomer is a vinylidene fluoride containing fluoroelastomer copolymer.

3. The wearable garment of claim 2, wherein the fluoroelastomer is a terpolymer of vinylidene fluoride, hexafluoropropylene and tetrafluoroethlyene.

4. The wearable garment of claim 2, wherein the fluoroelastomer is a dipolymer of vinylidene fluoride and hexafluoropropylene.

5. The wearable garment of claim 1, wherein the conductive powder is an electrically conductive powder of one or more of Ag, Cu, Au, Pd, Pt, Sn, Al, Ni, C, alloys thereof and mixtures thereof.

6. The wearable garment of claim 5, wherein the conductive powder is silver powder.

7. The wearable garment of claim 6, wherein the silver powder is in the form of silver flakes.

8. The wearable garment of claim 1, wherein the silane coupling agent is selected from the group consisting of [3-(2,3-epoxypropoxy)propyl] trimethoxysilane (3-glycidyloxypropyltrimethoxysilane), (am inopropyl)trimethoxysilane, (methacryloxypropyl) trimethoxysilane, (vinyl) trimethoxysilane and (mercaptopropyl)trimethoxysilane.

9. The wearable garment of claim 8, wherein the silane coupling agent is [3-(2,3epoxypropoxy)propyl]trimethoxysilane.

10. The wearable garment of claim 1, wherein the polymer thick film conductive paste composition comprises 1-35 wt % of 2-(2-ethoxyethoxy) ethyl acetate and 1-35 wt % of triethyl phosphate.

11. The wearable wearable garment of claim 1, wherein the printed conductor is printed on a substrate which has been subsequently laminated to the garment.

12. The wearable garment of claim 1, wherein a weight ratio of the at least one solvent to the silane coupling agent is 1:60.

13. The wearable garment of claim 1, wherein the polymer thick film conductive paste composition comprises 1-35 wt % of 2-(2-ethoxyethoxy) ethyl acetate and less than 5 wt % of triethyl phosphate.

14. The wearable garment of claim 1, wherein the polymer thick film conductive paste composition consists essentially of:
   a) 45-65 wt % conductive powder;
   b) 10-20 wt % fluoroelastomer;
   c) 0.1-3 wt % silane coupling agent comprising [3-(2, 3epoxypropoxy)propyl]trimethoxysilane;
   d) 1-35 wt % 2-(2-ethoxyethoxy)ethyl acetate; and
   e) 1-35 wt % of triethyl phosphate, wherein the wt % are based on the total weight of the polymer thick film conductive paste composition.

15. The wearable garment of claim 1, wherein the at least one solvent is added such that the composition has a viscosity of between 30-90 Pa·S.

* * * * *